(12) United States Patent
Dvorin et al.

(10) Patent No.: US 12,180,425 B2
(45) Date of Patent: *Dec. 31, 2024

(54) SYSTEMS, METHODS AND APPARATUS FOR PRODUCING SUSTAINABLE AVIATION FUEL

(71) Applicant: Kepler GTL LLC, Southlake, TX (US)

(72) Inventors: Jason Dvorin, Southlake, TX (US); Brent Nelson, Southlake, TX (US); Michael G. Smith, Keller, TX (US)

(73) Assignee: Kepler GTL LLC, Southlake, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/520,546

(22) Filed: Nov. 27, 2023

(65) Prior Publication Data

US 2024/0101909 A1   Mar. 28, 2024

Related U.S. Application Data

(63) Continuation of application No. 17/681,399, filed on Feb. 25, 2022, now Pat. No. 11,827,856, which is a continuation of application No. 17/495,335, filed on Oct. 6, 2021, now Pat. No. 11,795,402.

(51) Int. Cl.
*C10G 2/00* (2006.01)
*C10L 3/10* (2006.01)

(52) U.S. Cl.
CPC .............. *C10G 2/34* (2013.01); *C10L 3/106* (2013.01); *C01B 2203/062* (2013.01); *C10L 2200/0492* (2013.01); *C10L 2270/04* (2013.01); *C10L 2290/42* (2013.01)

(58) Field of Classification Search
None
See application file for complete search history.

(56) References Cited

U.S. PATENT DOCUMENTS

| | | | | |
|---|---|---|---|---|
| 6,114,400 A | * | 9/2000 | Nataraj | C01B 3/36 518/703 |
| 7,108,070 B2 | * | 9/2006 | Hall | B01J 19/0093 166/267 |
| 11,795,402 B2 | * | 10/2023 | Dvorin | C10G 2/34 |
| 11,827,856 B2 | * | 11/2023 | Dvorin | C10G 2/34 |
| 2005/0082202 A1 | * | 4/2005 | Ackerson | C10G 65/08 208/213 |
| 2006/0189702 A1 | * | 8/2006 | Tomlinson | C10G 2/32 518/726 |
| 2014/0308172 A1 | * | 10/2014 | Allam | C01B 3/38 422/162 |

FOREIGN PATENT DOCUMENTS

| | | | | |
|---|---|---|---|---|
| GB | 2357140 A | * | 6/2001 | F25J 1/0022 |
| WO | WO-2008079802 A1 | * | 7/2008 | B01D 53/52 |

* cited by examiner

*Primary Examiner* — Jennifer A Leung
(74) *Attorney, Agent, or Firm* — Michael G. Smith, Esq.

(57) ABSTRACT

Systems, methods and apparatus are provided through which in some implementations an apparatus to produce SAF from dry natural gas includes a natural gas reforming area that receives the dry natural gas and that produces synthetic gas from the dry natural gas, a Fischer-Tropsch conversion area that is operably coupled to the natural gas reforming area and that receives the synthetic gas and produces a hydrocarbon chain from the synthetic gas and a product upgrading area that is operably coupled to the Fischer-Tropsch conversion area that receives the hydrocarbon chain and that produces the SAF from the hydrocarbon chain.

9 Claims, 7 Drawing Sheets

SYSTEMS, METHODS AND APPARATUS FOR PRODUCING SUSTAINABLE AVIATION FUEL

RELATED APPLICATIONS

This application is a continuation patent application claiming priority under 35 U.S.C. 120 of co-pending U.S. Ser. No. 17/681,399 filed on 25 Feb. 2022 having docket Kepler_GTL.u.0001.Cont-01, which is a continuation patent application claiming priority under 35 U.S.C. 120 of U.S. Ser. No. 17/495,335 filed on 6 Oct. 2021 having docket Kepler_GTL.u.0001, patented on 24 Oct. 2023 as patent Ser. No. 11/795,402.

FIELD

This disclosure relates generally to environmentally sustainable biofuel, and more particularly to sustainable aviation fuel, sustainable aircraft fuel or synthesized isoparaffinic kerosene.

BACKGROUND

Conventional SAF is a fuel that is produced from livestock feeds. SAF is also known as sustainable aviation fuel, sustainable aircraft fuel or synthesized isoparaffinic kerosene (SPK) that is used in commercial aircraft jet engines. Currently, the airlines using SAF as a jet aircraft fuel include Air New Zealand, Japan Airlines, Interjet, AeroMexico, Iberia, Thomson Airways, Air France, Air China, Alaska Airways, Thai Airways, Etihad Airways, Latam Airways, Porter Airlines, Jetstar Airways, Air Canada, KLM, GOL Lineas Aéreas, Nextjet, Lufthansa, Scandinavian Airlines, Norwegian Airlines, Hainan Airlines, Alaska Airlines, Braathens Regional Airlines, Singapore Airlines, Hainan Airlines, China Airlines, Qantas, SpiceJet Airlines, jetBlue Airways, Etihad Airways, China Southern Airlines, United Airlines, Delta, Egyptair, and Finnair.

Because conventional SAF is not as combustible as conventional hydrocarbon aviation jet fuel, the conventional SAF is typically admixed as approx. 10% of the fuel, with conventional hydrocarbon aviation jet fuel being the remaining 90% of the fuel, in the same way that Ethanol is admixed with gasoline, thus providing only a 10% reduction in carbon emissions over the lifecycle of the fuel compared to conventional hydrocarbon aviation jet fuel that conventional SAF replaces.

Furthermore, because not all of the livestock feed is completely processed during the processing of the livestock feed, the conventional SAF includes some amount of the unprocessed livestock feed, which can coat the interior of jet engines during combustion of the conventional SAF, thus increasing maintenance costs of the jet engines.

In addition, in conventional natural gas production, a natural gas pipeline connects each wellhead to a natural gas collection point and a pipeline connects each natural gas collection point to a natural gas plant. Natural gas moves from wellheads to the plant because of higher pressure from one point to another, in particular, when the pressure of the natural gas is higher at the wellhead than the natural gas collection point, natural gas moves from the wellhead to the natural gas collection point. In order to move natural gas from the wellhead to the natural gas collection point, a compressor is employed at the wellhead that compresses the natural gas in the pipeline between the wellhead and the natural gas collection point, and thus natural gas moves in the pipeline from the wellhead to the natural gas collection point. Because it is often not economical to operate a compressor at the wellhead, the dry natural gas is quite often flared at the wellhead into the open atmosphere, thus wasting the dry natural gas for energy production and introducing $CO_2$ straight into the atmosphere without any attenuation or filtering.

For the reasons stated above, and for other reasons stated below which will become apparent to those skilled in the art upon reading and understanding the present specification, there is a need in the art for an even greater reduction in carbon emissions in comparison to conventional SAF that is produced from livestock feeds.

BRIEF DESCRIPTION

The above-mentioned shortcomings, disadvantages and problems are addressed herein, which will be understood by reading and studying the following specification.

In one aspect, systems, methods and apparatus are provided through which in some implementations an apparatus to produce SAF from dry natural gas includes a natural gas reforming apparatus that receives the dry natural gas and that produces synthetic gas from the dry natural gas, a Fischer-Tropsch conversion apparatus that is operably coupled to the natural gas reforming apparatus and that receives the synthetic gas and produces a hydrocarbon chain from the synthetic gas and a product upgrading apparatus that is operably coupled to the Fischer-Tropsch conversion apparatus that receives the hydrocarbon chain and that produces the SAF from the hydrocarbon chain. Livestock feeds are not used in the production of the SAF, thus there is no trace of livestock feed in the output SAF. In one particularly ecological implementation, the dry natural gas is sourced from dry natural gas that would be ordinarily flared into the open atmosphere, thus preventing the dry natural gas from being wasted and having the effect of merely introducing $CO_2$ into the atmosphere.

In another aspect, the dry natural gas is piped from a natural gas plant to the natural gas reforming apparatus, thus lowering the pressure of the natural gas at the natural gas plant, which in turn lowers the pressure at the natural gas collection point, which in turn lowers the pressure at the wellheads, which in some cases reduces or eliminates the need for a compressor at the wellhead, which in turns reduces or eliminates the need to flare the natural gas into the open atmosphere.

In yet another aspect, a SAF production system produces SAF from dry natural gas in which the SAF production system includes a SAF system which produces SAF from dry natural gas, a natural gas plant which is operably coupled to the SAF system via a first pipeline, a natural gas collection point operably coupled to the natural gas plant via a second pipeline and a wellhead that is operably coupled to the natural gas collection point via a third pipeline.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into five sections. In the first section, a system level overview is described. In the second section, apparatus of implementations are described. In the third section, implementations of methods are described. In the fourth section, hardware and operating environments in conjunction with which implementations may be practiced are described. Finally, in the fifth section, a conclusion of the detailed description is provided.

System Level Overview

Figure 1:
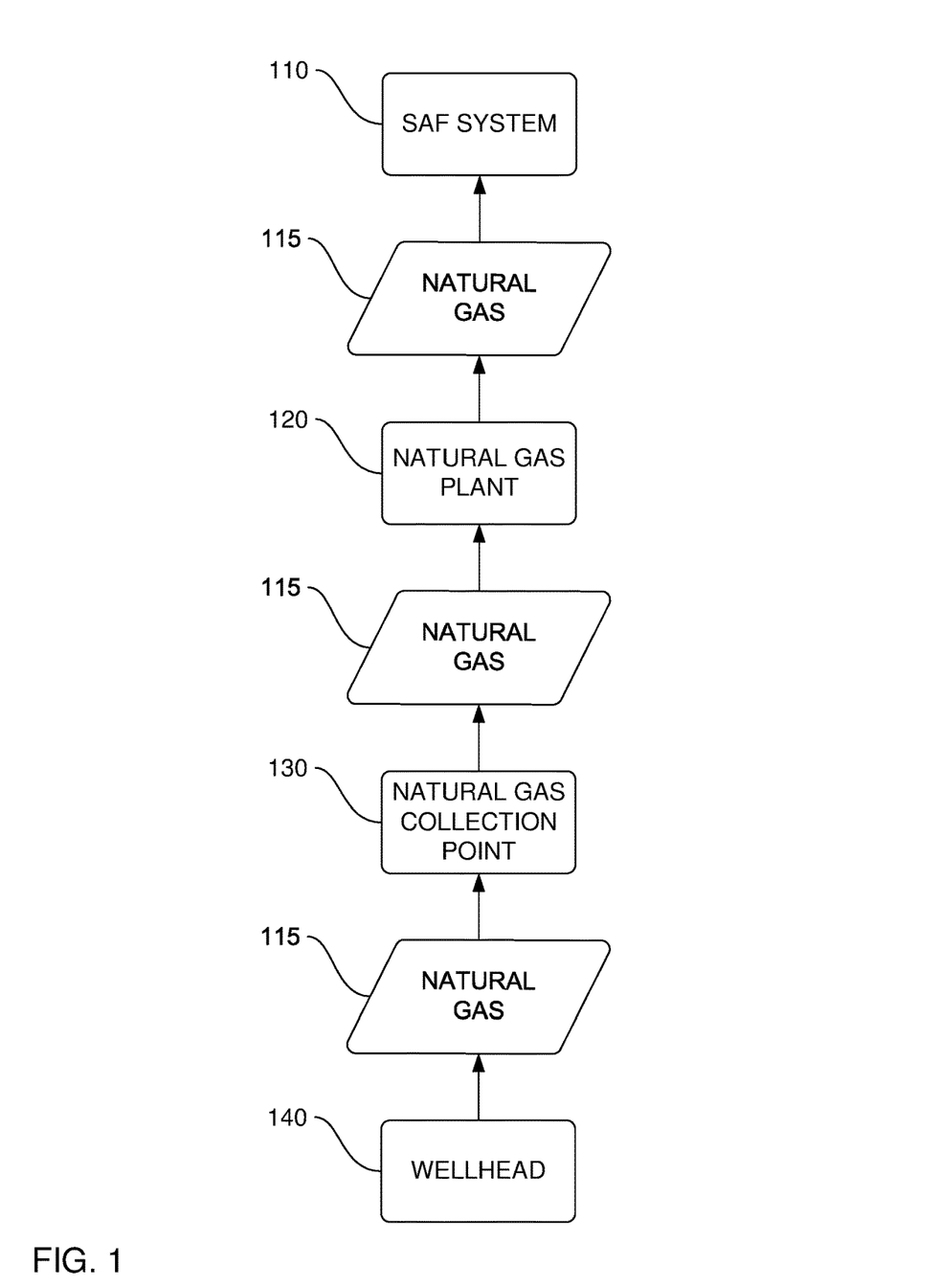
FIG. 1 is a block diagram of an overview of a SAF production system to produce SAF from dry natural gas, according to an implementation.

FIG. 1 is a block diagram of an overview of a SAF production system 100 to produce SAF from dry natural gas, according to an implementation. SAF production system 100 provides an economical and ecological system to reduce hydrocarbon combustion by jet engines of aircraft. SAF production system 100 includes a SAF system 110 to which dry natural gas 115 piped from a natural gas plant 120, thus lowering the pressure of natural gas 115 at the natural gas plant 120, a natural gas collection point 130 from 115 natural gas is pumped to the natural gas plant, which lowers the pressure of 115 natural gas at the natural gas collection point 130, and a wellhead 140 from which natural gas 115 is piped to the natural gas collection point, which lowers the pressure of natural gas 115 at the wellhead 140, which in some cases reduces or eliminates the need for a compressor at the wellhead, which in turns reduces or eliminates flaring of natural gas 115 into the open atmosphere at the wellhead 140.

Apparatus Implementations

Figure 2:
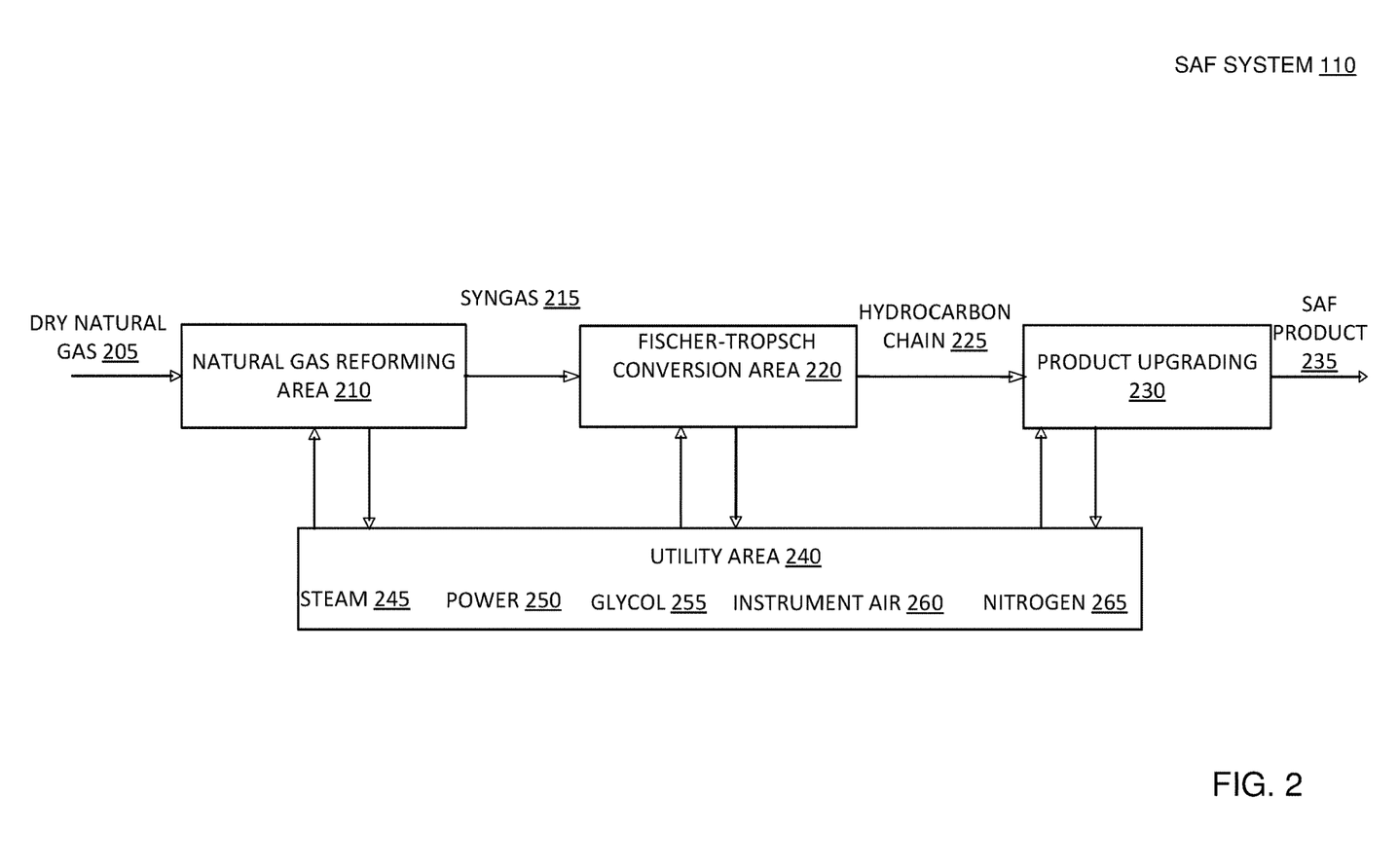
FIG. 2 is a block diagram of an overview of a system to produce SAF from dry natural gas, according to an implementation.

FIG. 2 is a block diagram of a SAF system 110 to produce SAF from dry natural gas, according to an implementation. SAF system 110 provides an economical and ecological system to reduce hydrocarbon combustion by jet engines of aircraft. SAF system 110 includes dry natural gas 205 that is input to a natural gas reforming apparatus 210. The natural gas reforming apparatus 210 produces synthetic gas 215 which is input to a Fischer-Tropsch conversion apparatus 220. The Fischer-Tropsch conversion apparatus 220 produces a hydrocarbon chain 225 from the synthetic gas 215 that is input into a product upgrading apparatus 230, and the product upgrading apparatus produces a SAF product 235 from the hydrocarbon chain 225. A utility apparatus 240 is operably coupled to the natural gas reforming apparatus 210, the Fischer-Tropsch conversion apparatus 220 and the product upgrading apparatus 230. The utility apparatus 240 exchanges steam 245, power 250, glycol 255, instrument air 260 and nitrogen 265 with the natural gas reforming apparatus 210, the Fischer-Tropsch conversion apparatus 220 and the product upgrading apparatus 230.

The system level overview of the operation of an implementation is described in this section of the detailed description.

While the SAF system 110 is not limited to any particular dry natural gas 205, natural gas reforming apparatus 210, synthetic gas 215, Fischer-Tropsch conversion apparatus 220, hydrocarbon chain 225, product upgrading apparatus 230, SAF product 235, utility apparatus 240, steam 245, power 250, glycol 255, instrument air 260 and nitrogen 265, for sake of clarity a simplified dry natural gas 205, natural gas reforming apparatus 210, synthetic gas 215, Fischer-Tropsch conversion apparatus 220, hydrocarbon chain 225, product upgrading apparatus 230, SAF product 235, utility apparatus 240, steam 245, power 250, glycol 255, instrument air 260 and nitrogen 265 are described. SAF system 110 does not use livestock feed in the production of the SAF product 235. Except in the production of SAF product 235 from dry natural gas 205, one of ordinary skill in the art would have no reason to combine the natural gas reforming apparatus 210, the Fischer-Tropsch conversion apparatus 220 and the product upgrading apparatus 230.

In the previous section, a system level overview of the operation of an implementation was described. In this section, the particular apparatus of such an implementation are described by reference to a series of diagrams.

Figure 3:
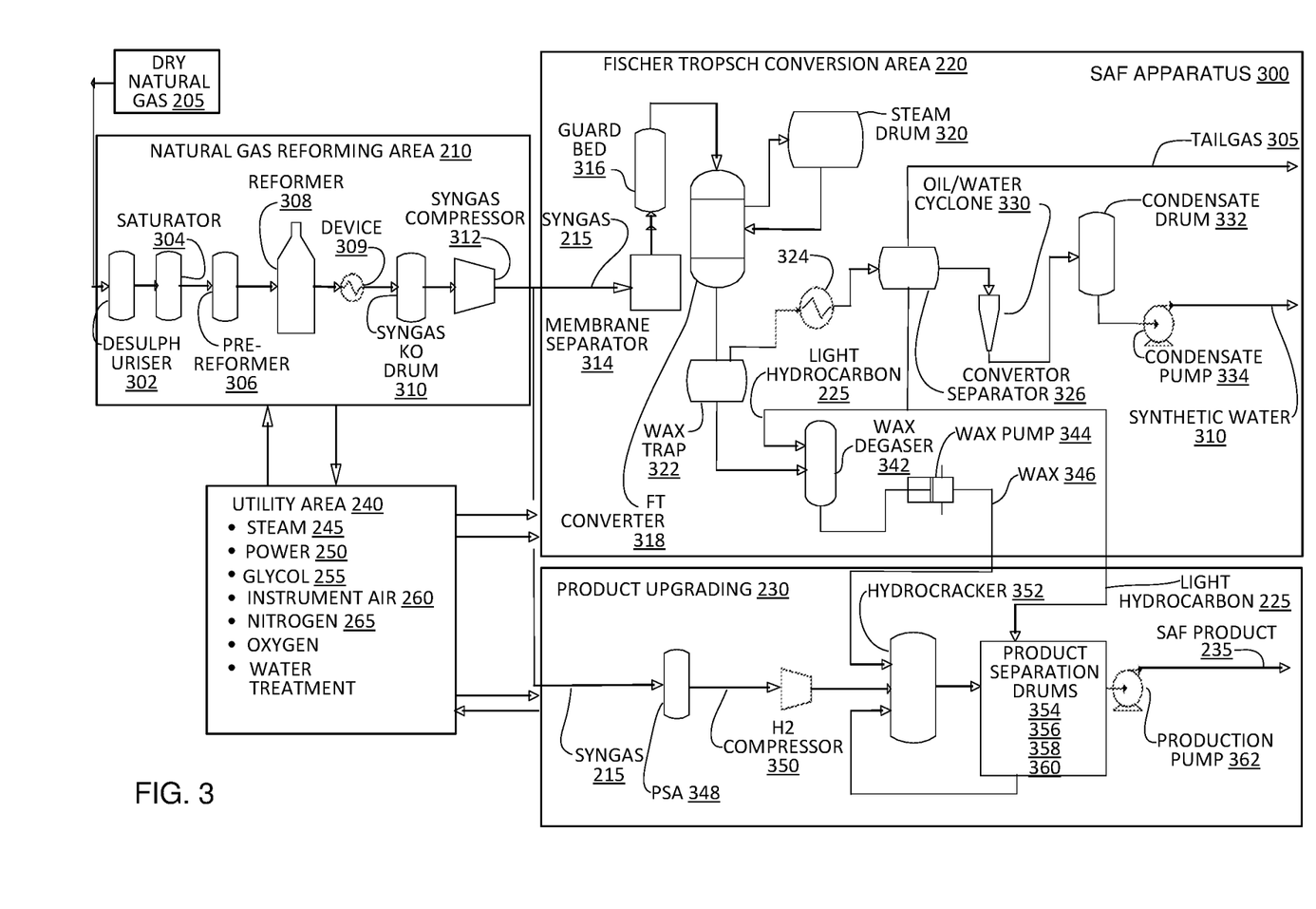
FIG. 3 is a block diagram of an apparatus to produce SAF from dry natural gas, according to an implementation

FIG. 3 is a block diagram of a SAF apparatus 300 to produce SAF from dry natural gas, according to an implementation. SAF apparatus 300 provides an economical and ecological apparatus to reduce hydrocarbon combustion by jet engines of aircraft.

SAF apparatus 300 includes dry natural gas 205 that is input to a natural gas reforming apparatus 210. The natural gas reforming apparatus 210 produces synthetic gas 215 which is input to a Fischer-Tropsch conversion apparatus 220. The natural gas reforming apparatus 210 includes a desulphuriser 302 that is operably coupled to a saturator 304 that is operably coupled to a pre former 306 that is operably coupled to a reformer 308 that is operably coupled to a heat exchanger 309 that is operably coupled to a SynGas KO drum 310 that is operably coupled to a syngas compressor 312. The Fischer-Tropsch conversion apparatus 220 produces a hydrocarbon chain 225 from the synthetic gas 215 that is input into a product upgrading apparatus 230. The Fischer-Tropsch conversion apparatus 220 includes a membrane separator 314 that is operably coupled to a guard bed 316 that is operably coupled to a Fischer-Tropsch converter 318 that is operably coupled to a steam drum 320, and the Fischer-Tropsch converter 318 is operably coupled to a wax trap 322 which is operably coupled to a heat exchanger 324 which is operably coupled to a converter separator 326 that outputs tail gas 328. The converter separator 326 is also operably coupled to an oil/water cyclone 330 which is operably coupled to a condenser from the 332 which is operably coupled to a condensate pump 334 which outputs synthetic water 336. The converter separator 326 also outputs light hydrocarbon 225. The converter separator 326 and the wax trap 322 are both operably coupled to tank 340 which storage which is operably coupled to a wax degasser 342 which is operably coupled to a wax pump 344 which outputs wax 346. The product upgrading apparatus produces a SAF product 235 from the light hydrocarbon chain 225. The product upgrading apparatus includes a PSA 348 that receives synthetic as 215 and that is operably coupled to an H2 compressor 350 which is operably coupled to a hydrocracker 352 which is operably coupled to product separation drums 354, 356, 358 and 360, which is operably coupled to a production pump 362. The utility apparatus 240 is operably coupled to the natural gas reforming apparatus 210, the Fischer-Tropsch conversion apparatus 220 and the product upgrading apparatus 230. The utility apparatus 240 exchanges steam 245, power 250, glycol 255, instrument air 260 and nitrogen 265 with the natural gas reforming apparatus 210, the Fischer-Tropsch conversion apparatus 220 and the product upgrading apparatus 230. SAF apparatus 300 does not use livestock feeds in the production of the SAF product 235.

Method Implementations

In the previous section, apparatus of the operation of an implementation was described. In this section, the particular methods performed by SAF system 110 and SAF apparatus 300 of such an implementation are described by reference to a series of flowcharts.

Figure 4:
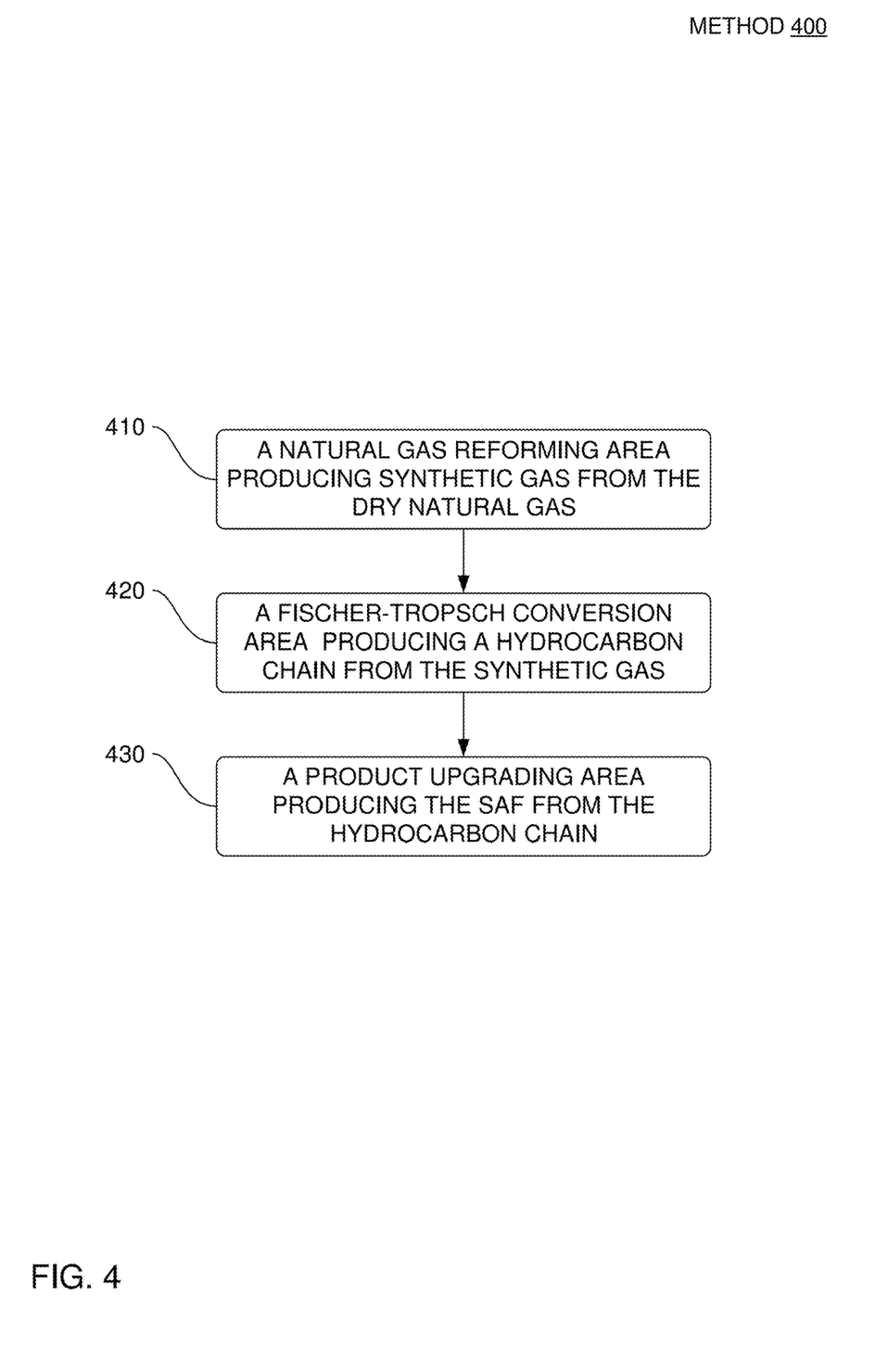
FIG. 4 is a flowchart of a method to produce SAF from dry natural gas, according to an implementation

FIG. 4 is a flowchart of a method 400 to produce SAF from dry natural gas, according to an implementation. Method 400 provides an economical and ecological method to reduce hydrocarbon combustion by jet engines of aircraft.

Method 400 includes a natural gas reforming apparatus receiving 410 the dry natural gas, and the natural gas reforming apparatus producing synthetic gas from the dry natural gas.

Method 400 includes receiving 420 the synthetic gas into a Fischer-Tropsch conversion apparatus, and the Fischer-Tropsch conversion apparatus producing a hydrocarbon chain from the synthetic gas.

Method 400 includes receiving 430 the hydrocarbon chain into a product upgrading apparatus, and the product upgrading apparatus producing the SAF product 235 from the hydrocarbon chain. Method 400 does not use livestock feeds in the production of the SAF product 235.

Figure 5:
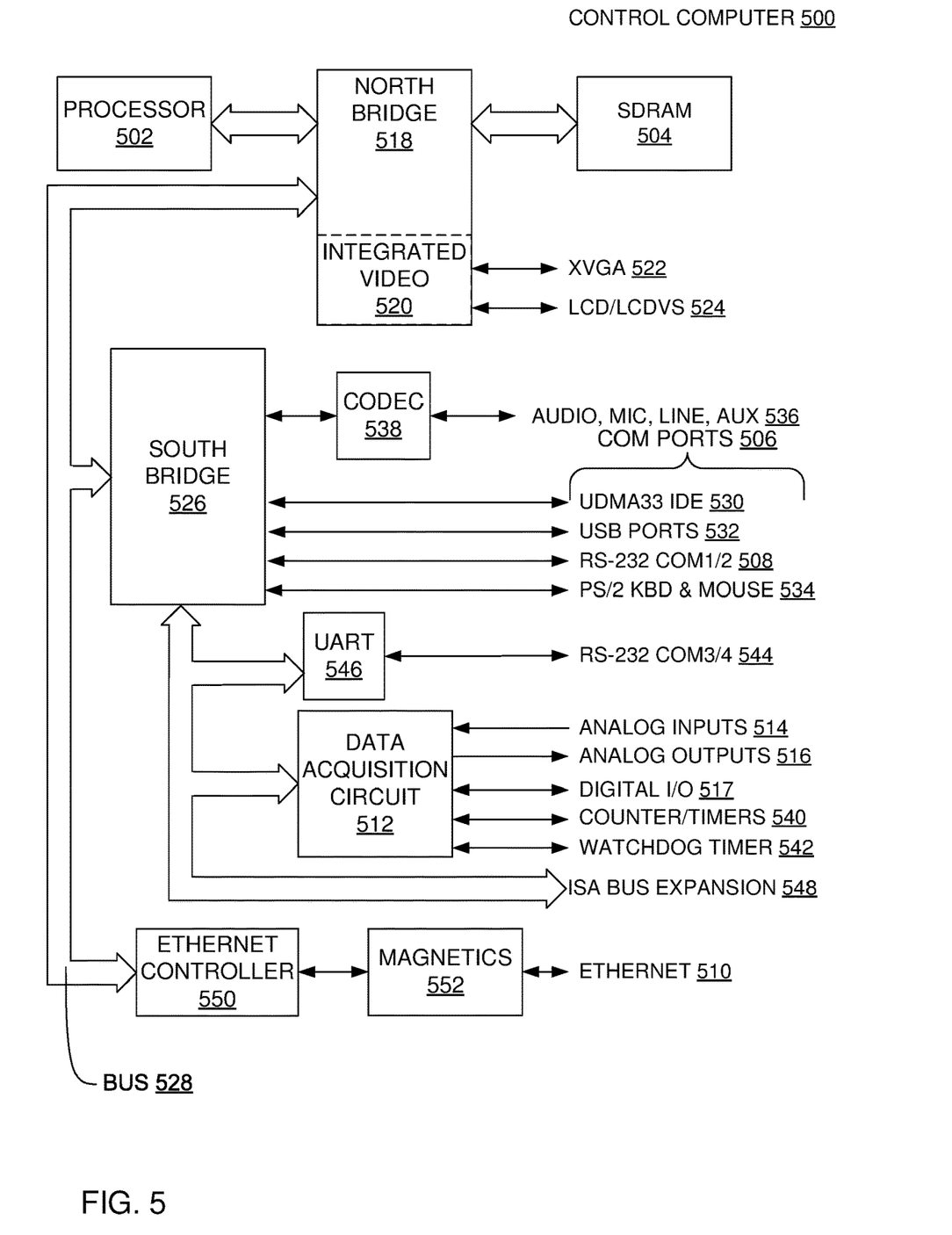
FIG. 5 is a block diagram of a SAF production control computer, according to an implementation.
Figure 7:
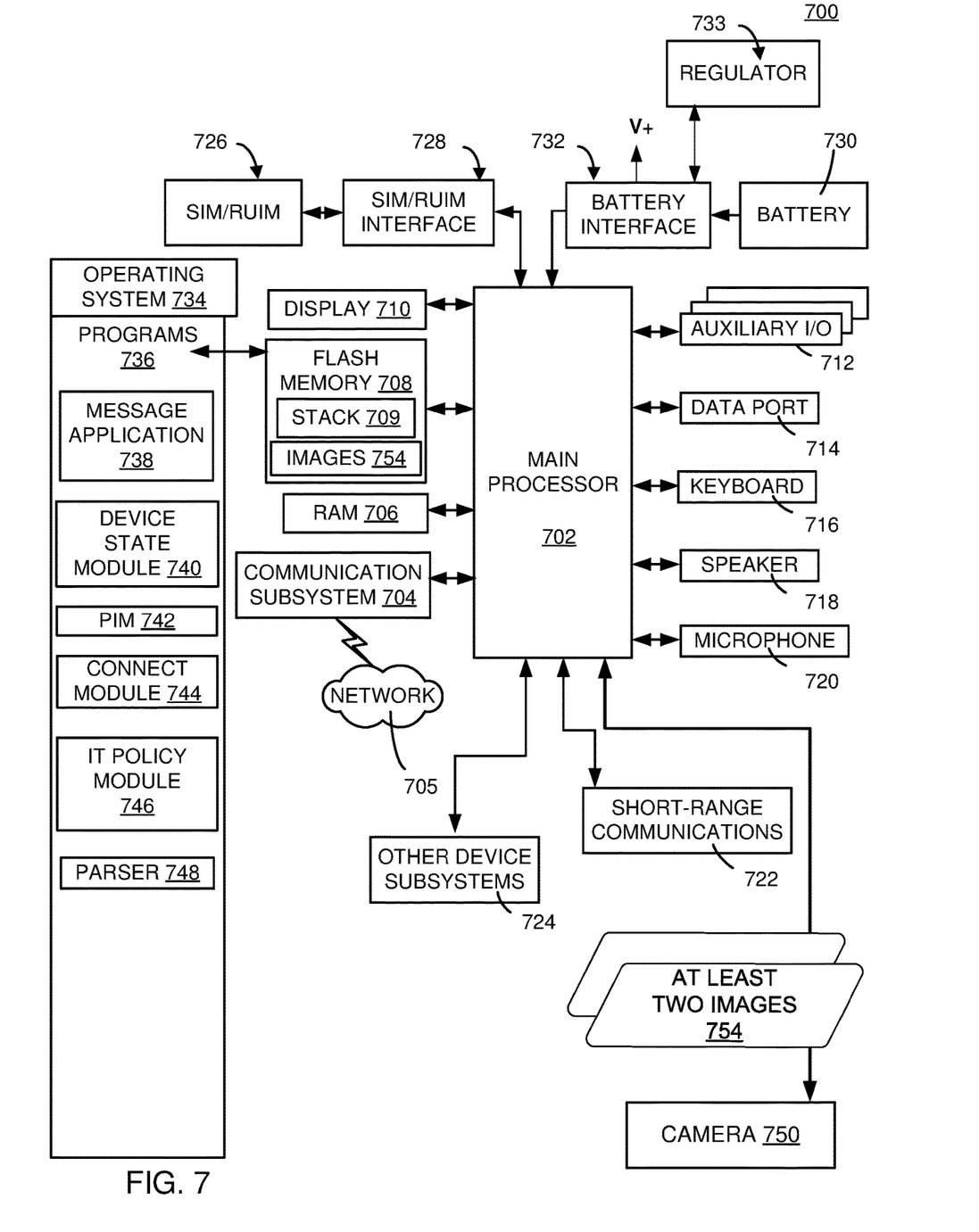
FIG. 7 is a block diagram of a SAF production control mobile device, according to an implementation.

In some implementations, method 400 is implemented as a sequence of instructions which, when executed by a processor, such as processor FIG. 502 in FIG. 5 or main processor 702 in FIG. 7, cause the processor 502 in FIG. 5 or main processor 702 in FIG. 7 to perform the respective method. In other implementations, method 400 is implemented as a computer-accessible medium having executable instructions capable of directing a processor, such as processor FIG. 502 in FIG. 5 or main processor 702 in FIG. 7 to perform the respective method. In varying implementations, the medium is a magnetic medium, an electronic medium, or an optical medium.

Hardware and Operating Environment

FIG. 5 is a block diagram of a SAF production control computer 500, according to an implementation. The SAF production control computer 500 includes a processor 502 (such as a Pentium III processor from Intel Corp. in this example) which includes dynamic and static ram and non-volatile program read-only-memory (not shown), operating memory 504 (SDRAM in this example), communication ports 506 (e.g., RS-232 COM1/2 508 or Ethernet 510), a data acquisition circuit 512 with analog inputs 514, analog output 516 and digital I/O port(s) 517.

In some implementations of the SAF production control computer 500, the processor 502 and the operating memory 504 are coupled through a bridge 518. In some implementations of the SAF production control computer 500, the bridge 518 includes a video port 520 having display outputs 522 and 524.

In some implementations of the SAF production control computer 500, the communication ports 506 are coupled through a bridge 526 and a bus 528 to the bridge 518. In some implementations of the SAF production control computer 500, the RS-232 508 communication port 506 also includes an integrated drive electronics (IDE) port 530 such as an ultra direct memory access 33 (UDMA33) port, and universal serial bus (USB) ports 532, and a PS/2 keyboard and mouse port 534. In some implementations of the SAF production control computer 500, a port 536 for audio, microphone, line and auxiliary devices is coupled through a coder/decoder (CODEC) 538 to the bridge 526.

In some implementations of the SAF production control computer 500, the data acquisition circuit 512 is also coupled to counter/timer ports 540 and watchdog timer ports 542. In some implementations of the SAF production control computer 500, an RS-232 port 544 is coupled through a universal asynchronous receiver/transmitter (UART) 546 to the bridge 526.

In some implementations of the SAF production control computer 500, an industry standard architecture (ISA) bus expansion port 548 is coupled to the bridge 526. In some implementations of the SAF production control computer 500, the Ethernet port 510 is coupled to the bus 528 through an Ethernet controller 550 and a magnetics 552.

Figure 6:
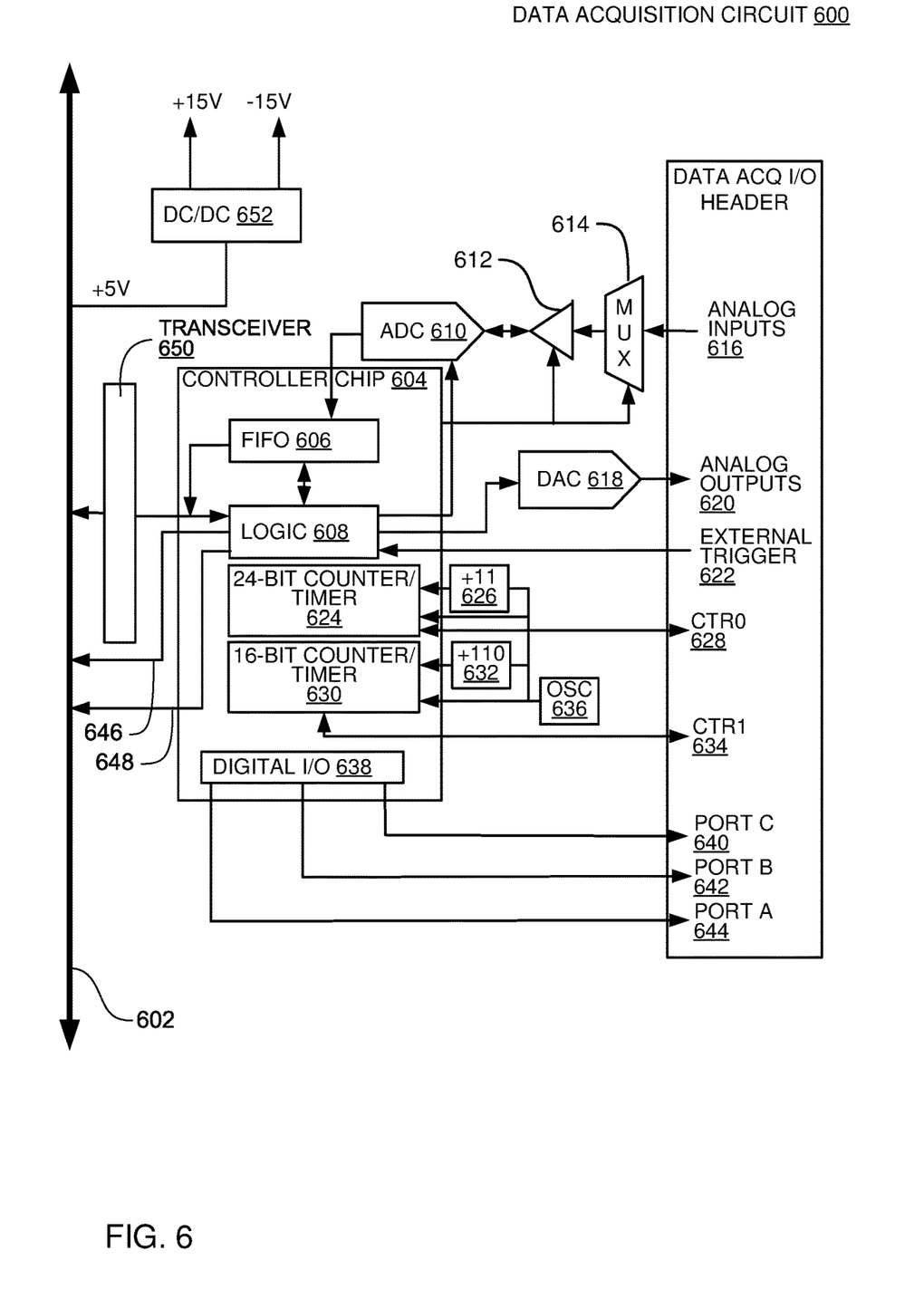
FIG. 6 is a block diagram of a data acquisition circuit of a SAF production control computer, according to an implementation.

FIG. 6 is a block diagram of a data acquisition circuit 600 of a SAF production control computer, according to an implementation. The data acquisition circuit 600 is one example of the data acquisition circuit 512 in FIG. 5 above. Some implementations of the data acquisition circuit 600 provide 16-bit A/D performance with input voltage capability up to +/−10V, and programmable input ranges.

The data acquisition circuit 600 includes a bus 602, such as a conventional PC/104 bus. The data acquisition circuit 600 is operably coupled to a controller chip 604. Some implementations of the controller chip 604 include an analog/digital first-in/first-out (FIFO) buffer 606 that is operably coupled to controller logic 608. In some implementations of the data acquisition circuit 600, the FIFO 606 receives signal data from and analog/digital converter (ADC) 610, which exchanges signal data with a programmable gain amplifier 612, which receives data from a multiplexer 614, which receives signal data from analog inputs 616.

In some implementations of the data acquisition circuit 600, the controller logic 608 sends signal data to the ADC 610 and a digital/analog converter (DAC) 618. The DAC 618 sends signal data to analog outputs. In some implementations of the data acquisition circuit 600, the controller logic 608 receives signal data from an external trigger 622.

In some implementations of the data acquisition circuit 600, the controller chip 604 includes a 24-bit counter/timer 624 that receives signal data from a +10 component 626 and exchanges signal data with a "CTR 0" 628. In some implementations of the data acquisition circuit 600, the controller chip 604 includes a 16-bit counter/timer 630 that receives signal data from a +100 component 632 and exchanges signal data with a "CTR 1" 628. The 24-bit counter/timer 624, the +10 component 626, the 16-bit counter/timer 630 and the +100 component 632 all receive signal data from a oscillator (OSC) 636.

In some implementations of the data acquisition circuit 600, the controller chip 604 includes a digital input/output (I/O) component 638 that sends digital signal data to "port C" 640, "port B" 642 and "port A" 644.

In some implementations of the data acquisition circuit 600, the controller logic 608 sends signal data to the bus 602 via a control line 646 and an interrupt line 648. In some implementations of the data acquisition circuit 600, the controller logic 608 exchanges signal data to the bus 602 via a transceiver 650. In some implementations of the data acquisition circuit 600, the bus supplies +5 volts of electricity to a DC-to-DC converter 652, that in turn supplies +15V and −15V of electricity.

Some implementations of the data acquisition circuit 600 include 4 6-bit D/A channels, 24 programmable digital I/O lines, and two programmable counter/timers. Placement of the analog circuitry away from the high-speed digital logic ensures low-noise performance for important applications. Some implementations of the data acquisition circuit 600 are fully supported by operating systems that can include, but are not limited to, DOS™, Linux™, RTLinux™, QNX™, Windows 98/NT/2000/XP/CE™, Forth™, and VxWorks™ to simplify application development.

FIG. 7 is a block diagram of a SAF production control mobile device 700, according to an implementation. The SAF production control mobile device 700 includes a number of components such as a main processor 702 that controls the overall operation of the SAF production control mobile device 700. Communication functions, including data and voice communications, are performed through a communication subsystem 704. The communication subsystem 704 receives messages from and sends messages to a wireless network 705. In this exemplary implementation of the SAF production control mobile device 700, the communication subsystem 704 is configured in accordance with the Global System for Mobile Communication (GSM), General Packet Radio Services (GPRS) standards, 3G, 4G, 5G and/or 6G. It will also be understood by persons skilled in the art that the implementations described herein are intended to use any other suitable standards that are developed in the future. The wireless link connecting the communication subsystem 704 with the wireless network 705 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 705 associated with SAF production control mobile device 700 is a GSM/GPRS, 3G, 4G, 5G and/or 6G wireless network in one exemplary implementation, other wireless networks may also be associated with the SAF production control mobile device 700 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, 3G, 4G, 5G and/or 6G. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 702 also interacts with additional subsystems such as a Random Access Memory (RAM) 706, a flash memory 708, a display 710, an auxiliary input/output (I/O) subsystem 712, a data port 714, a keyboard 716, a speaker 718, a microphone 720, short-range communications 722 and other device subsystems 724.

Some of the subsystems of the SAF production control mobile device 700 perform communication-related functions, whereas other subsystems may provide "resident" or on-device functions. By way of example, the display 710 and the keyboard 716 may be used for both communication-related functions, such as entering a text message for transmission over the wireless network 705, and device-resident functions such as a calculator or task list.

The SAF production control mobile device 700 can send and receive communication signals over the wireless network 705 after required network registration or activation procedures have been completed. Network access is associated with a subscriber or user of the SAF production control mobile device 700. To identify a subscriber, the SAF production control mobile device 700 requires a SIM/RUIM card 726 (i.e. Subscriber Identity Module or a Removable User Identity Module) to be inserted into a SIM/RUIM interface 728 in order to communicate with a network. The SIM card or RUIM 726 is one type of a conventional "smart card" that can be used to identify a subscriber of the SAF production control mobile device 700 and to personalize the SAF production control mobile device 700, among other things. Without the SIM card 726, the SAF production control mobile device 700 is not fully operational for communication with the wireless network 705. By inserting the SIM/RUIM card 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 726 includes a processor and memory for storing information. Once the SIM/RUIM card 726 is inserted into the SIM/RUIM interface 728, it is coupled to the main processor 702. In order to identify the subscriber, the SIM/RUIM card 726 can include some user parameters such as an International Mobile Subscriber Identity (IMSI). An advantage of using the SIM/RUIM card 726 is that a subscriber is not necessarily bound by any single physical mobile device. The SIM/RUIM card 726 may store additional subscriber information for a mobile device as well, including datebook (or calendar) information and recent call information. Alternatively, user identification information can also be programmed into the flash memory 708.

The SAF production control mobile device 700 is a battery-powered device and includes a battery interface 732 for receiving one or more rechargeable batteries 730. In one or more implementations, the battery 730 can be a smart battery with an embedded microprocessor. The battery interface 732 is coupled to a regulator 733, which assists the battery 730 in providing power V+ to the SAF production control mobile device 700. Although current technology makes use of a battery, future technologies such as micro fuel cells may provide the power to the SAF production control mobile device 700.

The SAF production control mobile device 700 also includes an operating system 734 and modules 736 to 748 which are described in more detail below. The operating system 734 and the modules 736 to 748 that are executed by the main processor 702 are typically stored in a persistent store such as the flash memory 708, which may alternatively be a read-only memory (ROM) or similar storage element (not shown). Those skilled in the art will appreciate that portions of the operating system 734 and the modules 736 to 748, such as specific device applications, or parts thereof, may be temporarily loaded into a volatile store such as the RAM 706. Other modules can also be included.

The subset of modules 736 that control basic device operations, including data and voice communication applications, will normally be installed on the SAF production control mobile device 700 during its manufacture. Other modules include a message application 738 that can be any suitable software program that allows a user of the SAF production control mobile device 700 to send and receive electronic messages. Various alternatives exist for the message application 738 as is well known to those skilled in the art. Messages that have been sent or received by the user are typically stored in the flash memory 708 of the SAF production control mobile device 700 or some other suitable storage element in the SAF production control mobile device 700. In one or more implementations, some of the sent and received messages may be stored remotely from the SAF production control mobile device 700 such as in a data store of an associated host system with which the SAF production control mobile device 700 communicates.

The modules can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the SAF production control mobile device 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 705. PIM data items may be seamlessly integrated, synchronized, and updated via the wireless network 705 with the mobile device subscriber's corresponding data items stored and/or associated with a host computer system. This functionality creates a mirrored host computer on the SAF production control mobile device 700 with respect to such items. This can be particularly advantageous when the host computer system is the mobile device subscriber's office computer system.

The SAF production control mobile device 700 also includes a connect module 744, and an IT policy module 746. The connect module 744 implements the communication protocols that are required for the SAF production control mobile device 700 to communicate with the wireless infrastructure and any host system, such as an enterprise system, with which the SAF production control mobile device 700 is authorized to interface.

The connect module 744 includes a set of APIs that can be integrated with the SAF production control mobile device 700 to allow the SAF production control mobile device 700 to use any number of services associated with the enterprise system. The connect module 744 allows the SAF production control mobile device 700 to establish an end-to-end secure, authenticated communication pipe with the host system. A subset of applications for which access is provided by the connect module 744 can be used to pass IT policy commands from the host system to the SAF production control mobile device 700. This can be done in a wireless or wired manner. These instructions can then be passed to the IT policy module 746 to modify the configuration of the SAF production control mobile device 700. Alternatively, in some cases, the IT policy update can also be done over a wired connection.

The IT policy module 746 receives IT policy data that encodes the IT policy. The IT policy module 746 then ensures that the IT policy data is authenticated by the SAF production control mobile device 700. The IT policy data can then be stored in the flash memory 706 in its native form. After the IT policy data is stored, a global notification can be sent by the IT policy module 746 to all of the applications residing on the SAF production control mobile device 700. Applications for which the IT policy may be applicable then respond by reading the IT policy data to look for IT policy rules that are applicable.

The IT policy module 746 can include a parser 748, which can be used by the applications to read the IT policy rules. In some cases, another module or application can provide the parser. Grouped IT policy rules, described in more detail below, are retrieved as byte streams, which are then sent (recursively) into the parser to determine the values of each IT policy rule defined within the grouped IT policy rule. In one or more implementations, the IT policy module 746 can determine which applications are affected by the IT policy data and send a notification to only those applications. In either of these cases, for applications that are not being executed by the main processor 702 at the time of the notification, the applications can call the parser or the IT policy module 746 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 746 sends an acknowledgement back to the host system to indicate that the IT policy data was received and successfully applied.

Other types of modules can also be installed on the SAF production control mobile device 700. These modules can be third party applications, which are added after the manufacture of the SAF production control mobile device 700. Examples of third party applications include games, calculators, utilities, etc.

The additional applications can be loaded onto the SAF production control mobile device 700 through at least one of the wireless network 705, the auxiliary I/O subsystem 712, the data port 714, the short-range communications subsystem 722, or any other suitable device subsystem 724. This flexibility in application installation increases the functionality of the SAF production control mobile device 700 and may provide enhanced on-device functions, communication-related functions, or both. For example, secure communication applications may enable electronic commerce functions and other such financial transactions to be performed using the SAF production control mobile device 700.

The data port 714 enables a subscriber to set preferences through an external device or software application and extends the capabilities of the SAF production control mobile device 700 by providing for information or software downloads to the SAF production control mobile device 700 other than through a wireless communication network. The alternate download path may, for example, be used to load an encryption key onto the SAF production control mobile device 700 through a direct and thus reliable and trusted connection to provide secure device communication.

The data port 714 can be any suitable port that enables data communication between the SAF production control mobile device 700 and another computing device. The data port 714 can be a serial or a parallel port. In some instances, the data port 714 can be a USB port that includes data lines for data transfer and a supply line that can provide a charging current to charge the battery 730 of the SAF production control mobile device 700.

The short-range communications subsystem 722 provides for communication between the SAF production control mobile device 700 and different systems or devices, without the use of the wireless network 705. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard and/or telephone-type keypad. However, other types of keyboards may also be used. A composed item may be transmitted over the wireless network 705 through the communication subsystem 704.

For voice communications, the overall operation of the SAF production control mobile device 700 is substantially similar, except that the received signals are output to the speaker 718, and signals for transmission are generated by the microphone 720. Alternative voice or audio I/O subsystems, such as a voice message recording subsystem, can also be implemented on the SAF production control mobile device 700. Although voice or audio signal output is accomplished primarily through the speaker 718, the display 710 can also be used to provide additional information such as the identity of a calling party, duration of a voice call, or other voice call related information.

In some implementations, the SAF production control mobile device 700 includes a camera 750 receiving a plurality of images 754 from and examining pixel-values of the plurality of images 754.

CONCLUSION

A SAF production system apparatus and method is described. A technical effect of the SAF production system 100, SAF system 110, SAF apparatus 300 and method 400 is production of SAF that does not involve or is sourced from livestock feed. Although specific implementations are illustrated and described herein, it will be appreciated by those of ordinary skill in the art that any arrangement which is calculated to achieve the same purpose may be substituted for the specific implementations shown. This application is intended to cover any adaptations or variations. For example, although described in general terms, one of ordinary skill in the art will appreciate that implementations can be made in dry natural gas or any other natural gas that provides the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future Fischer-Tropsch conversion apparatus, different natural gas reforming apparatus, and new product upgrading apparatus.

The terminology used in this application meant to include all petrochemical natural gases and alternate technologies which provide the same functionality as described herein.

The invention claimed is:

1. An apparatus to produce a sustainable aviation fuel from a dry natural gas, the apparatus comprising:
    a natural gas reforming apparatus that receives the dry natural gas and that produces synthetic gas from the dry natural gas;
    a Fischer-Tropsch conversion apparatus that is directly and operably coupled to the natural gas reforming apparatus and that receives the synthetic gas and produces a hydrocarbon chain from the synthetic gas, wherein the Fischer-Tropsch conversion apparatus further comprises a membrane separator that is operably coupled to a guard bed that is operably coupled to a Fischer-Tropsch converter being operably coupled to a steam drum, the Fischer-Tropsch converter being operably coupled to a wax trap which is operably coupled to a heat exchanger which is operably coupled to a converter separator that outputs tail gas, the converter separator is also operably coupled to an oil/water cyclone which is operably coupled to a condenser which is operably coupled to a condensate pump which outputs synthetic water, the converter separator and the wax trap are both operably coupled to a wax degasser which is operably coupled to a wax pump which outputs wax; and
    a product upgrading apparatus that is operably coupled to the Fischer-Tropsch conversion apparatus that receives the hydrocarbon chain and that produces the sustainable aviation fuel from the hydrocarbon chain, wherein the product upgrading apparatus further comprises a pressure swing adsorption device that is operably coupled to an H2 compressor which is operably coupled to a hydrocracker which is operably coupled to product separation drums, which is operably coupled to a production pump.

2. The apparatus of claim 1, wherein the apparatus further comprises:
    a utility apparatus that is operably coupled to the natural gas reforming apparatus, the Fischer-Tropsch conversion apparatus and the product upgrading apparatus.

3. The apparatus of claim 1, wherein a utility apparatus exchanges steam, power, glycol, instrument air and nitrogen with the natural gas reforming apparatus, the Fischer-Tropsch conversion apparatus and the product upgrading apparatus.

4. A sustainable aviation fuel production system to produce sustainable aviation fuel from a dry natural gas, the sustainable aviation fuel production system comprising:
a sustainable aviation fuel system which produces the sustainable aviation fuel from the dry natural gas;
a natural gas plant which is operably coupled to the sustainable aviation fuel system via a first pipeline;
a natural gas collection point operably coupled to the natural gas plant via a second pipeline; and
a wellhead that is operably coupled to the natural gas collection point via a third pipeline,
wherein the sustainable aviation fuel system further comprises:
a natural gas reforming apparatus that receives the dry natural gas and that produces synthetic gas from the dry natural gas;
a Fischer-Tropsch conversion apparatus that is directly and operably coupled to the natural gas reforming apparatus and that receives the synthetic gas and produces a hydrocarbon chain from the synthetic gas, wherein the Fischer-Tropsch conversion apparatus further comprises a membrane separator that is operably coupled to a guard bed that is operably coupled to a Fischer-Tropsch converter being operably coupled to a steam drum, the Fischer-Tropsch converter being operably coupled to a wax trap which is operably coupled to a heat exchanger which is operably coupled to a converter separator that outputs tail gas, the converter separator is also operably coupled to an oil/water cyclone which is operably coupled to a condenser which is operably coupled to a condensate pump which outputs synthetic water, the converter separator and the wax trap are both operably coupled to a wax degasser which is operably coupled to a wax pump which outputs wax; and
a product upgrading apparatus that is operably coupled to the Fischer-Tropsch conversion apparatus that receives the hydrocarbon chain and that produces the sustainable aviation fuel from the hydrocarbon chain, wherein the product upgrading apparatus further comprises a pressure swing adsorption device that is operably coupled to an H2 compressor which is operably coupled to a hydrocracker which is operably coupled to product separation drums, which is operably coupled to a production pump.

5. The sustainable aviation fuel production system of claim 4, wherein the sustainable aviation fuel production system further comprises:
a utility apparatus that is operably coupled to the natural gas reforming apparatus, the Fischer-Tropsch conversion apparatus and the product upgrading apparatus.

6. The sustainable aviation fuel production system of claim 4, wherein a utility apparatus exchanges steam, power, glycol, instrument air and nitrogen with the natural gas reforming apparatus, the Fischer-Tropsch conversion apparatus and the product upgrading apparatus.

7. The sustainable aviation fuel production system of claim 4, wherein the wellhead includes no compressor.

8. The sustainable aviation fuel production system of claim 4, wherein the sustainable aviation fuel production system includes no compressor between the wellhead and the natural gas collection point.

9. The sustainable aviation fuel production system of claim 4, wherein the sustainable aviation fuel system draws the dry natural gas from the natural gas plant through the first pipeline, thus lowering pressure of natural gas at the natural gas plant, which lowers pressure of the dry natural gas at the natural gas collection point, which draws the dry natural gas from the wellhead through the third pipeline without use of a compressor.

\* \* \* \* \*